United States Patent Office 2,946,655
Patented July 26, 1960

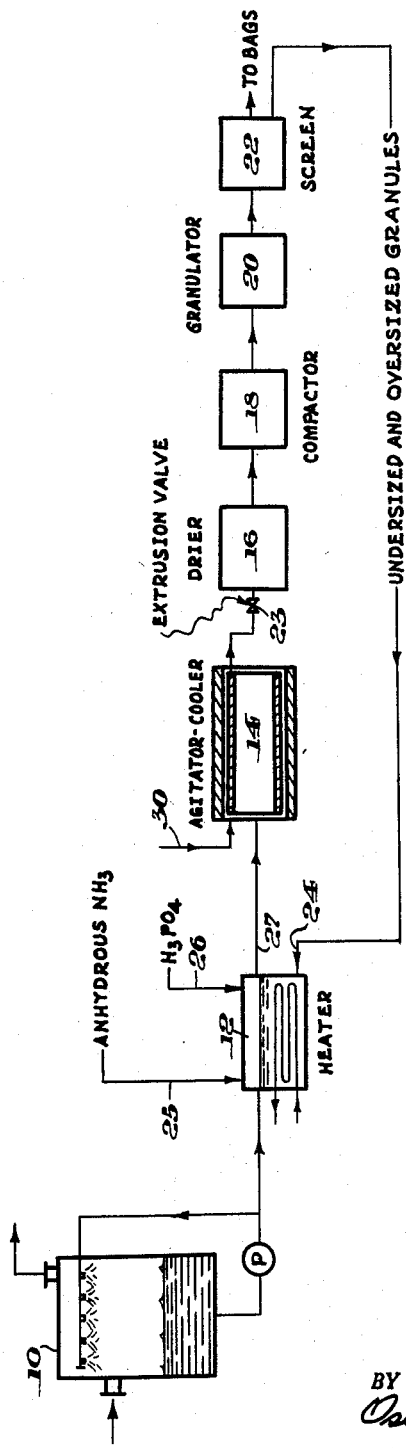
July 26, 1960  E. J. HELM ET AL  2,946,655
PRODUCTION OF DIAMMONIUM PHOSPHATE
Filed Aug. 22, 1957
INVENTORS.
EDWARD J. HELM, and
ELWOOD V. SCHULTE
BY
Oscar B Brumback
their ATTORNEY

2,946,655

PRODUCTION OF DIAMMONIUM PHOSPHATE

Edward J. Helm and Elwood V. Schulte, Pittsburgh, Pa., assignors to Koppers Company, Inc., a corporation of Delaware Filed Aug. 22, 1957, Ser. No. 679,701

4 Claims. (Cl. 23—107)

This invention relates generally to the production of diammonium phosphate and more particularly to the production of diammonium phosphate from the ammonia in coke-oven gas.

Coke-oven gas normally contains ammonia to the extent of two to three percent by volume, and, in addition, contains substantial quantities of hydrogen sulfide, carbon dioxide, hydrogen cyanide, and aromatics such as benzol, toluol, xylol, and traces of phenol, pyridine and many other organic compounds. Conventional practice is to remove the ammonia from the coke-oven gas by scrubbing the gas in saturators with sulfuric acid, thereby producing ammonium sulfate for use as fertilizer. A popular type of saturator for this operation is described in United States Patent No. 2,671,011, issued to Van Ackeren. Recent declines in the consumption and prices of ammonium sulfate, however, have caused attention to be directed to the production of diammonium phosphate from the ammonia in coke-oven gas.

Diammonium phosphate has the advantage of containing both of the desirable fertilizer elements, nitrogen and phosphorus; but the production of diammonium phosphate presents a number of problems that are not present in the production of ammonium sulfate. For example, unless the pH value of the scrubbing solution is maintained within a narrow range in excess of a pH of about 5.5 as the ammonia is being absorbed, the salt crystallizing in the solid phase would be monoammonium phosphate. This salt forms troublesome rock salt encrustations within the absorbing equipment and is undesirable for fertilizer because of its low nitrogen content. Even if the pH value of the solution could be controlled to obtain diammonium phosphate, the vapor pressure equilibrium of the ammonia is so great that 10 to 20 percent of the ammonia remains in the gas and is not absorbed into the solution; this residual ammonia then causes undesirable effects, such as corrosion and polymerization, in the other equipment through which the gas travels beyond the saturator. In contrast, the process for producing ammonium sulfate is susceptible of a wide range of control; the sulfuric acid of the scrubbing solution, for example, can vary from 2 to 8 percent without appreciably changing the crystal structure or ammonia recovery.

Since a large investment has been involved in the apparatus for recovery of ammonia as ammonium sulfate, a number of proposals have been made for the use of this existing equipment for the production of diammonium phosphate. Copending application Serial No. 641,594, assigned to the assignee of the present invention, describes a process for producing diammonium phosphate in the equipment which had normally been used for producing ammonium sulfate and wherein as much ammonia as possible is recovered from the gas in one saturator as diammonium phosphate and the gas then sent through a second saturator to remove the residual ammonia as ammonium sulfate. Copending application Serial No. 641,682, now United States Patent 2,921,837, also assigned to the assignee of the present invention, describes a process for using conventional equipment at the coke-oven plant for manufacturing diammonium phosphate so that the ammonia that is not recovered from the gas in the first saturator is recovered in a second saturator also having phosphoric acid, the strength of the acid in the second saturator being sufficient to completely remove the ammonia from the gas but the solution in the second saturator being maintained unsaturated with respect to its ammonium phosphate content and being fed back to the first saturator where the diammonium phosphate is eventually crystallized out. In each of these cases the salt is crystallized from the solution, separated from the solution, and then dried.

Copending application Serial No. 656,955, filed May 3, 1957, assigned to the assignee of the present invention describes another approach to the production of diammonium phosphate from coke-even gas wherein the solution in which the product is formed is evaporated from the product. Since the gas contains other constituents which would remain in the product as contaminates, the gas is first washed with water to remove the ammonia vapor and inherently any other water-soluble constituents from the gas. The ammonia and other constituents are then stripped from the water, and subsequently the contaminates are washed from the vapor with water to provide a relatively pure, concentrated ammonia vapor. This ammonia vapor is then contacted with concentrated phosphoric acid and the phosphate solution is agitated and cooled to produce a thick slurry of diammonium phosphate. This slurry is extruded, dried, compacted to a sheet, and the sheet granulated to particles of diammonium phosphate of the desired size.

An object of this invention is to provide for the production of ammonium phosphate from the ammonia in coke-oven gas by the use of existing absorbers in plants that are already equipped to manufacture ammonium sulfate so that additional investment in plant equipment is low.

A further object of the invention is to provide a novel process for recovering the ammonia from a coke-oven gas in a phosphoric acid solution and thereafter, through evaporation, recovering the ammonia and phosphoric acid as granules of diammonium phosphate.

This invention contemplates the recovery of the ammonia in coke-oven gas as diammonium phosphate by absorbing the ammonia in an aqueous solution of phosphoric acid by intimately contacting the gas and solution, thereafter heating the solution to evaporate water therefrom, cooling and agitating the concentrated solution while adding ammonia thereto so as to form a thick slurry, partially drying said slurry and compacting it to form a film, and granulating this film to obtain desired sized granules.

The above and further objects and novel features of the present invention will appear more fully from the detailed description when the same is read in connection with the accompanying drawing. It is to be expressly understood, however, that the drawing is not intended as a definition of the invention but is for purposes of illustration only.

The single sheet of drawing schematically illustrates apparatus for carrying out the process of the present invention.

Turning now to the drawing, the apparatus for carrying out the invention comprises generally an absorber 10, a heater 12, an agitator-cooler 14, a dryer 16, a compactor 18, a granulator 20, and a screen 22. Absorber 10 may be of conventional type and advantageously of the type described in Van Ackeren Patent No. 2,671,011; heater 12 may be of a conventional open type evaporator having a steam coil heating element; agitator cooler 14 may be of a conventional type wherein a cooling jacket surrounds a cylinder in which a rotor turns and by means of plates on the rotor scrapes the cylinder walls to prevent caking and provide further heat transfer from the cylinder walls to the slurry; dryer 16 may be a conventional kiln type dryer; compactor 18 may also be of a conventional type wherein a pair of rollers compacts the material to a thin sheet; a granulator 20 may be of a conventional type; and screen 22 may be of any conventional type.

In accordance with the present invention ammonia absorber 10 is operated so that the concentration of salts in solution and the molecular ratio of ammonia to phosphoric acid is such as to maintain the amount of solids in solution at or near the maximum. Ammonium phosphate, for example, reaches a peak of solubility in water at the normal operating conditions of 30 to 60° C. when the molecular ratio of ammonia to phosphoric acid is between 1.45 and 1.55. For example, about 188 pounds of ammonium phosphate is soluble per 100 pounds of water at 50° C. when the mol ratio of ammonia to phosphoric acid is about 1.5.

In this invention a solution of the above type, that is almost saturated, is brought into sufficiently intimate contact with the coke-oven gas either through the use of the well-known cracker pipe or spray absorbers so as to remove substantially all of the ammonia from the gas without removing any substantial quantity of other impurities from the gas. A balance is maintained between the addition of water and the water evaporated from the solution during this time so as to prevent the crystallization of either the monoammonium or diammonium phosphate from the solution. The solution is collected in the saturator and conducted to the heater 12 where the solution is brought to the boiling point. Since the solution is unsaturated at this higher temperature, solid diammonium phosphate by way of line 24 may be added to the solution to bring the solution to a condition of saturation. Alternatively of course, anhydrous ammonia and phosphoric acid by way of lines 25 and 26 may be added to bring the solution to a saturated state. If necessary, some water may be evaporated in the heater to bring the solution to the saturation point.

The heated solution is then pumped through conduit 27 to agitator-cooler 14 where it is subjected to cooling and agitation while sufficient pure ammonia or concentrated ammonia vapor, by way of line 30, is added to the solution to bring the ratio of ammonia to phosphoric acid to approximately 2 to 1, this being the ratio for diammonium phosphate. Under these conditions, the solution in the agitator-cooler changes to a cooled, thickened, paste-like material or slurry.

The slurry is fed from agitator-cooler 14 through a conventional extruding valve 22 to kiln dryer 16. The material is dried in dryer 16 to a degree suitable for operation in compactor 18 and then fed through the rollers of compactor 18. The material leaves the compactor as a thin film and is granulated to a proper size in granulator 20. The granules are screened in the screen 22. The product granules of desirable size are stored for use as fertilizer, and the oversize or undersize granules are sent back to the heater 12 to supply the solid diammonium phosphate for bringing the solution to the saturated state.

In accordance with the present invention, it is also possible to maintain the solution in absorber 10 in a saturated state with respect to the ammonium phosphate content so that as ammonia is absorbed in the solution there is a partial crystallization of ammonium phosphate from the solution. In this case, the solution contains a mol ratio of ammonia to phosphoric acid slightly in excess of the mol ratio that produces the maximum solubility of the salt in the solution at the operating temperature of the saturator. The crystalline material formed in the solution (which crystals are diammonium phosphate) is removed along with the solution and sent to heater 12 where the solution is brought to the boiling point. The dissolution of the crystallized diammonium phosphate (having a mol ratio of ammonia to phosphoric acid of less than 2 to 1) causes this mol ratio of the solution containing the redissolved salt to be above the point of greatest solubility. Since the latter material has a higher ammonia vapor pressure than the material used in the first embodiment, there would be a loss of ammonia from the solution. This solution, therefore, may be boiled so as to remove sufficient ammonia therefrom or it may have phosphoric acid added thereto to reduce the mol ratio of ammonia to phosphoric acid to that approaching the ratio corresponding to the greatest solubility of ammonium phosphates at the boiling point of the solution. The vapors from the heater 12 may be condensed by means not shown and the noncondensed ammonia returned to absorber 10. The concentrated mixture from heater 12 is sent through an agitator-cooler where it is reacted with additional ammonia, and then passes through a dryer, compactor, granulator and screen as in the embodiment above.

The maximum solubility of ammonium phosphate at 50° C. is at a mol ratio of ammonia to phosphoric acid of 1.5 to 1 when about 188 pounds of the salt are in solution per 100 pounds of water. In other words, the solution at this point contains approximately 35 percent water. When an ammonium phosphate solution is heated to the boiling point at atmospheric pressure, the point of maximum solubility has been found to be at an ammonia to phosphoric acid ratio of about 1.45 to 1 at which time about 300 pounds of the salt can be held in solution per 100 pounds of water. Thus, by heating the solution after it leaves the ammonia scrubbing stage or absorber, solid diammonium phosphate and/or additional phosphoric acid and anhydrous ammonia or a desired combination of these may be added to cause the solution to reach the mol ratio at the boiling point where the ratio of water to salt in the solution is at a minimum. The solution or mixture of solution and solid ammonium phosphates produced will contain a minimum of water to be evaporated. This final mixture can be adjusted by addition of anhydrous ammonia thereto to have an ammonia to phosphoric acid ratio equal to 2 to 1 (the ratio for diammonium phosphate). When this solution is cooled in the agitator-cooler 14, the final product has a great percentage of diammonium phosphate in solid form due to the lower solubility of this salt in the water present in the mixture at the lower temperature.

According to the present invention, it is also possible to operate the ammonia absorber 10 at a mol ratio of ammonia to phosphoric acid in the scrubbing solution of slightly more than 1.5 to 1 to permit enough diammonium phosphate to crystallize or precipitate out. When this solution and crystal mixture is removed from the absorber, it can be heated to the boiling point at heater 12 and adjusted to the ammonia to phosphoric acid mol ratio of 1.45 to 1 with phosphoric acid to cause redissolving of previously crystallized diammonium phosphate. The resulting solution will contain a minimum percentage of water as we have described in the foregoing for the 1.45 to 1 mol ratio solution at its boiling point. Thereafter, the solution can be treated as above and passed through the agitator-cooler 14.

The foregoing has presented several embodiments of a novel process for recovering the ammonia from coke-oven gas as diammonium phosphate suitable for fertilizer. The ammonia is recovered by absorption in a solution in a conventional scrubber under conditions such that the other impurities in the gas are not absorbed in the solution. The novel process eliminates the slurry feed tank and expensive centrifuges needed heretofore and yet enables conventional ammonium sulfate production equipment to be used for the production of diammonium phosphate without a substantial additional investment.

What is claimed:

1. A process for the recovery of ammonia from coke oven gas as diammonium phosphate crystals in the absence of formations of monoammonium phosphate crystals comprising the steps of contacting said gas with an aqueous solution of ammonium phosphate at a temperature of between about 30 and 60° C. and having an ammonia to phosphoric acid molecular ratio between about 1.45 to 1.55 so as to absorb the ammonia from said gas, heating said ammonia enriched solution to its boiling point to evaporate water therefrom so that said ammonia enriched solution becomes saturated with respect to ammonium phosphate, cooling and agitating said saturated and enriched ammonia solution while adding ammonia to provide an ammonia to phosphoric acid molecular ratio about 2 to 1 so as to form a slurry of diammonium phosphate, partially drying said slurry, compacting said slurry to form a sheet, and granulating said sheet to desired sized granules of diammonium phosphate.

2. A process for the recovery of ammonia from coke oven gas as diammonium phosphate crystals in the absence of formations of monoammonium phosphate crystals comprising the steps of intimately contacting said gas in an absorption zone with an aqueous solution of ammonium phosphate at a temperature of between about 30 to 60° C. and having an ammonia to phosphoric acid molecular ratio between about 1.45–1.55 so as to absorb the ammonia from said gas, heating said ammonia enriched solution to its boiling point to evaporate water while adding solid diammonium phosphate to said ammonia enriched solution so that ammonia enriched solution becomes saturated with respect to ammonium phosphate, cooling and agitating said saturated and enriched ammonia solution while adding ammonia in amounts sufficient to provide an ammonia to phosphoric acid molecular ratio of at least between about 2–1 so as to form a slurry of diammonium phosphate, drying and compacting said diammonium slurry to form a sheet, and granulating said sheet to desired sized granules of diammonium phosphate.

3. A process for the recovery of ammonia from coke oven gas as diammonium phosphate crystals in the absence of the formation of ammonium phosphate crystals comprising the steps of contacting the gas in an absorption zone in an aqueous solution maintained at 30–60° C. and containing a saturated solution of ammonium phosphate having an ammonium phosphate acid molecular ratio of about 1.5 to 1 so as to absorb the ammonia from said gas and form a solution super saturated with respect to ammonium phosphate, heating said solution supersaturated with respect to ammonium phosphate to its boiling point to evaporate water therefrom while adding at least one of solid diammonium phosphate and phosphoric acid in quantities sufficient to maintain said last named solution saturated with respect to ammonium phosphate, cooling and agitating said saturated solution while adding ammonia to provide an ammonium phosphate acid molecular ratio of at least 2 to 1 so as to change said ammonium phosphate to a slurry of diammonium phosphate, drying and compacting said diammonium solution to form a sheet, and granulating said sheet to diammonium phosphate crystals of desired sized granules.

4. A process for the recovery of ammonia from coke oven gas as diammonium phosphate crystals in the absence of the formation of ammonium phosphate crystals comprising the steps of intimately contacting the gas in an absorption zone in an aqueous solution maintained at 30–60° C. and containing a saturated solution of ammonium phosphate having an ammonium phosphate acid molecular ratio slightly above 1.5:1 so as to absorb the ammonia from said gas and form a solution saturated with respect to the ammonium phosphate content and of which some of the ammonium phosphate crystalizes out of said solution as diammonium phosphate, heating said solution saturated with respect to ammonium phosphate and said ammonium phosphate crystals to its boiling point to evaporate water therefrom while adding phosphoric acid thereto in quantities to maintain said last named solution saturated with respect to ammonium phosphate, cooling and agitating said saturated solution while adding ammonia in amounts sufficient to provide an ammonium phosphate acid molecular ratio of at least 2–1 so as to change said ammonium phosphate to a slurry of diammonium phosphate, drying and compacting said diammonium solution to form a sheet, and granulating said sheet to diammonium phosphate crystals of desired sized granules.

References Cited in the file of this patent
UNITED STATES PATENTS

| | | |
|---|---|---|
| 1,653,390 | Coltman | Dec. 20, 1927 |
| 1,834,418 | Pevere | Dec. 1, 1931 |
| 2,016,816 | Hansen | Oct. 8, 1935 |
| 2,033,389 | Moore | Mar. 10, 1936 |
| 2,040,563 | Phillips | May 12, 1936 |
| 2,830,036 | O'Donnell | Apr. 8, 1958 |